No. 866,534. PATENTED SEPT. 17, 1907.
C. SUBERT.
HUMIDIFIER.
APPLICATION FILED MAY 13, 1907.
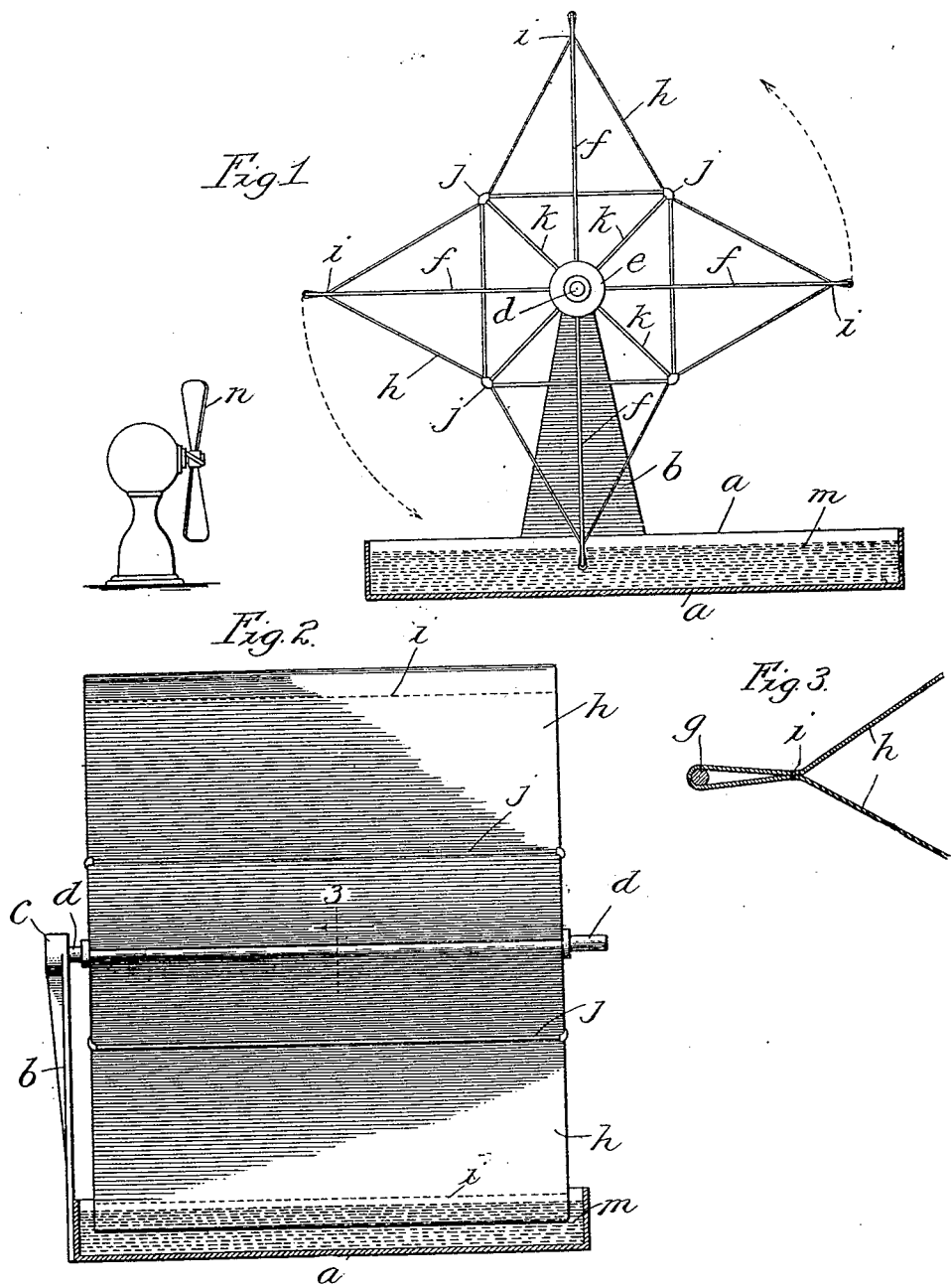

UNITED STATES PATENT OFFICE.

CHARLES SUBERT, OF CHICAGO, ILLINOIS.

HUMIDIFIER.

No. 866,534.  Specification of Letters Patent.  Patented Sept. 17, 1907.

Application filed May 13, 1907. Serial No. 373,408.

*To all whom it may concern:*

Be it known that I, CHARLES SUBERT, a citizen of the United States, residing at Chicago, in the county of Cook and State of Illinois, have invented certain new and useful Improvements in Humidifiers, of which the following is a description, reference being had to the accompanying drawings, forming a part of this specification, in which corresponding letters of reference in the different figures indicate like parts.
The object of my invention is to provide a simple, cheap and durable device for producing and maintaining humidity and for purifying the air in tobacco houses, factories, schools, hospitals and elsewhere. I accomplish said object by means of a revoluble frame having an absorbent material mounted thereon in conjunction with means for supplying water or other liquid thereto, and means for projecting a current of air against the face of said absorbent material, as well as for causing the rotation of said revoluble element or frame, all of which is hereinafter more particularly described and definitely pointed out in the claims.

In the drawings, Figure 1, is a side elevation of a device embodying the features of my invention, the water reservoir being shown in longitudinal vertical section, Fig. 2, is a view taken at right angles thereto, the reservoir being likewise shown in section, and Fig. 3, is a sectional view in detail taken upon the line 3—, Fig. 2, viewed in the direction of the arrow there shown.
Referring to the drawings, *a* represents a shallow trough or reservoir, upon opposite sides of which are secured vertical supports or standards *b* having suitable bearings *c* for the reception of journals *d* upon a central shaft. Rigidly attached to hubs *e* upon said shaft are four rods *f* which are extended radially therefrom and thence across parallel to the shaft, one of said parallel portions being shown at *g*, Fig. 3, thereby forming a framework upon which is stretched an absorbent material *h*, preferably of cotton fabric having a loose or somewhat open weave. The fabric is brought together a short distance from the cross-bars *g* of the frame and connected across parallel to said cross-bars as shown at *i*. Cross-wires *j* are extended midway between the cross-bars *g* and parallel therewith, and connected at the ends with wires *k*, Fig. 1, which are in turn attached to a central hub *e*, upon the shaft. These cross wires serve to draw the fabric in towards the shaft to form a series of reëntrant angles between the cross-bars *g*, for the purpose hereinafter stated.
The reservoir *a* is supplied with water *m*, the height of which should not be sufficient to extend above the line *j* of the absorbent material thereby preventing too much water from entering between the adjacent fabrics and weighting the frame to an undue extent. An electric or other fan *n* is placed opposite said framework in position to direct a current of air against the lowermost wing thereof and at right angles thereto, as shown in Fig. 1, thereby causing the rotation of the fan in the direction indicated by the arrows. This causes the air current to impinge upon the surface of the water and to take up more or less moisture therefrom in addition to that which is evaporated from the surface of the fabric.

A further advantage is that the convergence of the air current between the water surface and the wings, insures a more positive rotation than if directed towards the top, in which case the air current might be so deflected as to permit the device to stop. I have found that by projecting the air current directly against the face of the wings or at an angle to the plane of the fabric, the liquid is caused to evaporate with greater rapidity than when the current is driven in lines parallel to said plane. Moreover, the evaporation is relatively more rapid when the fabric is not permitted to become too wet. This result is facilitated by so mounting the fabric upon the frame that two thicknesses cannot be brought together as they would be were they stretched radially from the axis, in which case the water would lie between the folds and would not be acted upon by the air. Besides, the meshes soon become so filled with foreign matter that it is impracticable to force air through them and hence the air, to be effectual at all, must be projected against the face of the fabric. A further advantage in addition to this is that the air current serves to continually rotate the frame, which rotation itself not only serves to increase the evaporation, but is of great importance in causing the purification of the air in the room in which it is operated. When the device is started a continuous circulation of air is induced, all of which is brought, over and over, into contact with the moist wings against which any particles of dust contained therein are caused to lodge. These are gradually washed into the reservoir and settle to the bottom, thus leaving the atmosphere pure and clean, while maintaining it at the proper degree of humidity.

My improved device is not only useful for moistening tobacco and for similar purposes, but may be used to advantage in schools, theaters and hospitals for establishing an air circulation, eliminating dust and distributing disinfectants, it being obvious that any disinfecting liquid may be substituted for or added to the water in the reservoir.

Having thus described my invention, I claim:

1. An humidifier in which is combined a revoluble structure consisting of main skeleton frame elements extending radially from an axial shaft, an absorbent material mounted thereon, means located between said main frame elements for drawing said absorbent material inwardly to form a series of reëntrant angles therein, a water receptacle located beneath said revoluble structure to permit the water to contact therewith as the latter is rotated, and means for directing a current of air against the exterior of said fabric to rotate the frame.

2. An humidifier in which is combined a revoluble frame mounted upon a shaft, said frame consisting of a series of radial arms connected at their outer ends, absorbent material stretched thereon, means for drawing said material inwardly towards the axis, between said frames to form reëntrant angles, a liquid holding tank below said frame and a fan arranged to direct a current of air between the tank and the axis of the frame.

In testimony whereof, I have signed this specification in the presence of two subscribing witnesses, this 10th day of May 1907.

CHARLES SUBERT.

Witnesses:
 D. H. FLETCHER,
 CARRIE E. JORDAN.